United States Patent [19]

Tishman

[11] Patent Number: 4,482,939
[45] Date of Patent: Nov. 13, 1984

[54] DIRECTIONALLY VARIABLE LIGHTING ASSEMBLY

[76] Inventor: Andrew Tishman, 144 E. 84th St., New York, N.Y. 10028

[21] Appl. No.: 507,980

[22] Filed: Jun. 27, 1983

[51] Int. Cl.³ .............................................. B60Q 1/00
[52] U.S. Cl. ........................................ 362/64; 362/66; 362/269; 362/272; 362/285; 362/286; 362/287; 362/295; 362/419
[58] Field of Search .................. 362/64, 66, 269, 272, 362/285, 286, 287, 419, 295

[56] References Cited

U.S. PATENT DOCUMENTS

| 1,974,371 | 9/1934 | Tamussino | 240/62 |
| 2,284,538 | 5/1942 | Parkes | 240/7.1 |
| 2,639,367 | 5/1953 | Chiuzzi | 240/61.6 |
| 3,116,026 | 12/1963 | Gupta | 240/61.7 |
| 3,361,901 | 1/1968 | Mesler et al. | 240/7.1 |
| 3,526,764 | 9/1970 | Klie et al. | 240/7.1 |
| 4,066,886 | 1/1978 | Martin | 362/68 |
| 4,195,327 | 3/1980 | Piquot | 362/66 |
| 4,196,459 | 4/1980 | Dick | 362/66 |
| 4,276,581 | 6/1981 | Orii et al. | 362/40 |

Primary Examiner—Stephen J. Lechert, Jr.
Attorney, Agent, or Firm—Benasutti and Murray

[57] ABSTRACT

An apparatus containing a headlight gimballed for rotation within the enclosure of the apparatus. The headlight is capable of exposure through an opening in the enclosure, and is capable of directional adjustment in accordance with signals produced at a remote location. A cover is provided for selectively enclosing the opening which exposes the headlight, and is capable of selectively enclosing or exposing the opening in accordance with signals produced at a remote location.

30 Claims, 8 Drawing Figures

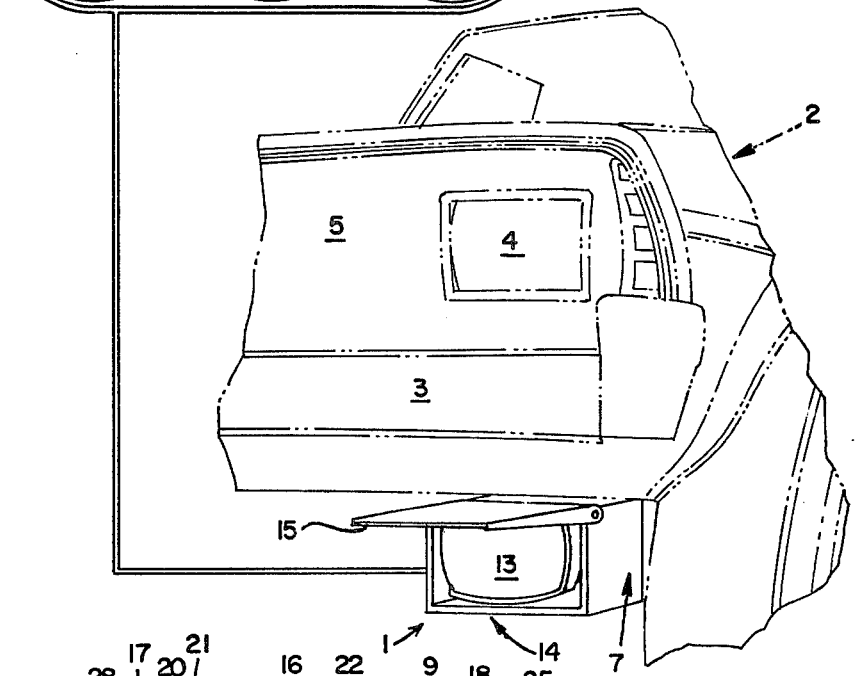
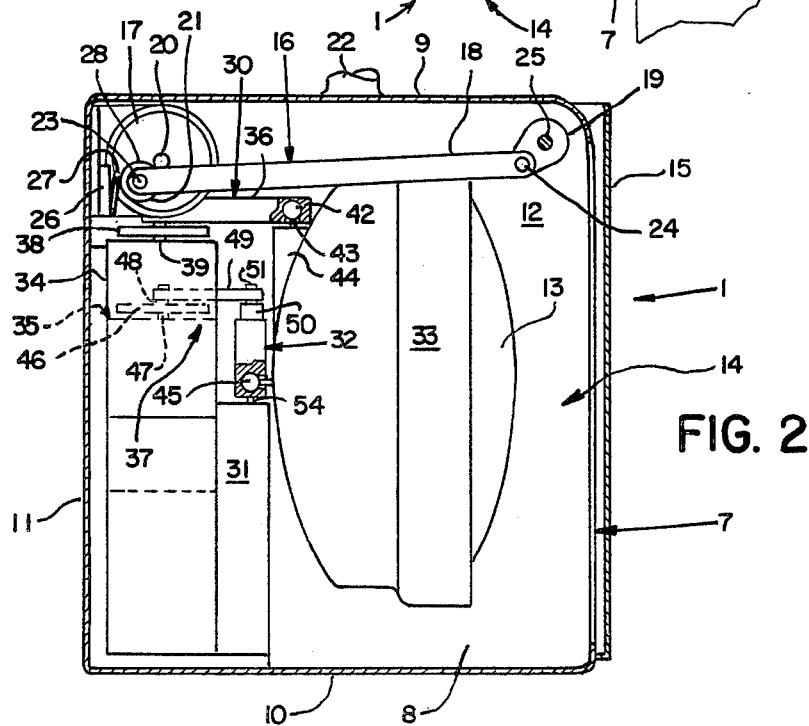
FIG. 1
FIG. 2

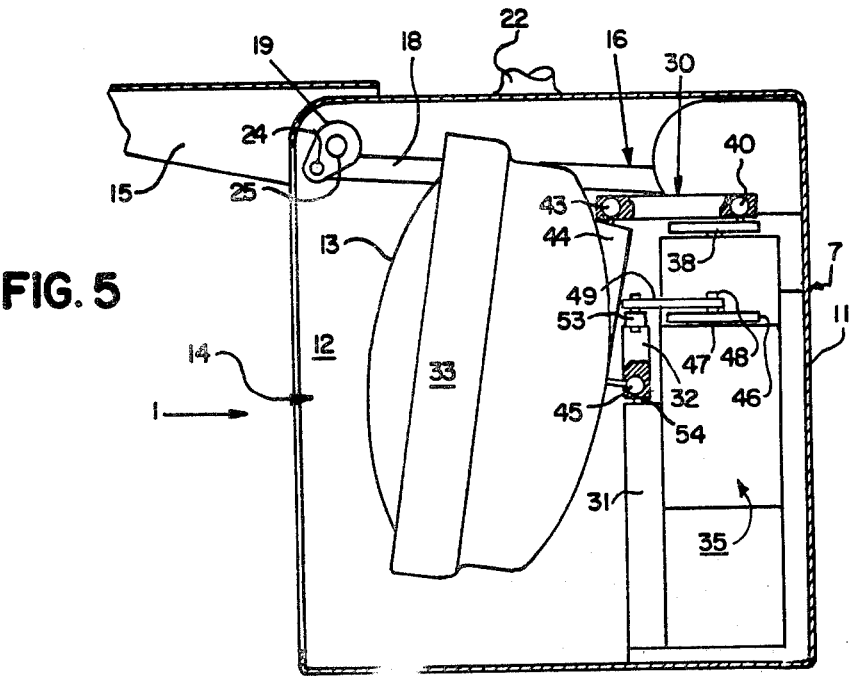
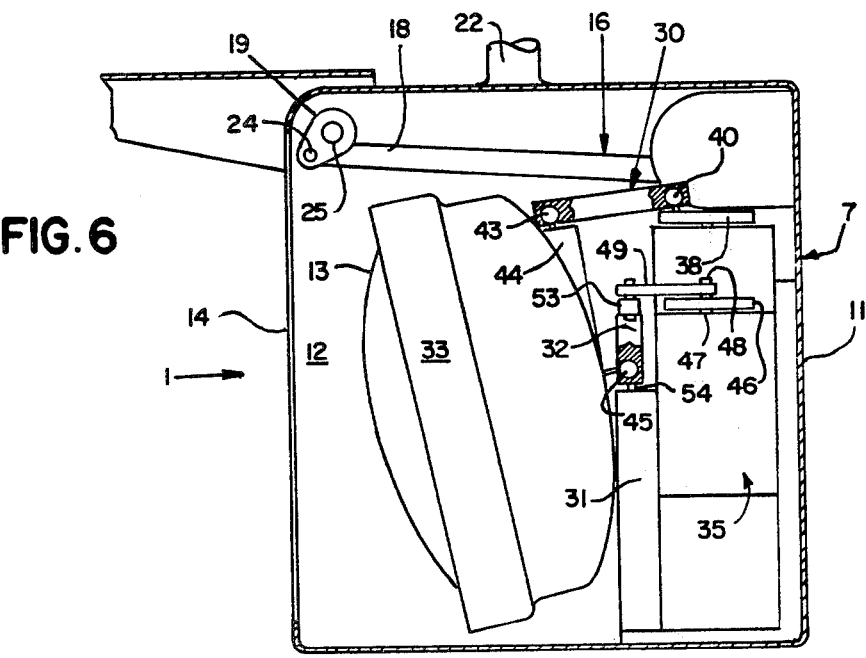

DIRECTIONALLY VARIABLE LIGHTING ASSEMBLY

BACKGROUND OF THE INVENTION

The present invention relates generally to lighting systems which are primarily intended for use in connection with motor vehicles, and more particularly, to a lighting assembly which can be variably directed in accordance with a user's needs.

Conventional motor vehicles traditionally incorporate one or more headlights to enable use of the vehicle during night hours. Many times, auxiliary lighting systems in addition to those already incorporated in the vehicle are used to accommodate special driving conditions such as fog, mist, poorly lit roads, etc. Often, these auxiliary systems are placed on peripheral structures associated with the vehicle such as bumpers, fenders and roll-bars.

Generally, both types of lighting systems are fixedly attached to the associated vehicle. As a result, the beam of light developed by such systems is only projected from the vehicle in a single direction. Of course, this is generally acceptable for conventional lighting applications. However, a need has long been recognized for a lighting system which is capable of projecting a directionally variable beam of light to accommodate special needs.

For example, in some applications it has become desirable to develop a lighting system which is capable of varying the elevation of the beam of light projected, primarily to correct for changes in vehicle attitude which may result from unusual vehicle loading. U.S. Pat. Nos. 4,276,581; 4,195,327; and 4,066,886 each illustrate examples of systems capable of providing such a function. In each case, when unusually heavy loads are placed in the trunk (or tailgate) of the vehicle, headlight elevation is varied in accordance with resulting changes in vehicle attitude, in turn correcting projection of the beam of light from the vehicle to accommodate the unusual loading.

In other applications is has become desirable to develop a lighting system which is capable of steering the projected beam of light together with the vehicle, primarily to light a road as the vehicle traverses a corner. U.S. Pat. Nos. 3,116,026 and 1,974,371 each illustrate examples of systems capable of providing such a function. In each case, a mechanism ssociated with the steering system of the vehicle causes simultaneous rotation of a headlight assembly, in turn causing the beam of light projected to follow the curvature of the road being traversed.

One other application which has received attention is the development of a lighting system which is capable of directional variation, both horizontally and vertically, preferably in accordance with the needs of the vehicle's operator. U.S. Pat. No. 2,639,367 illustrates an example of one such system, which utilizes a system of mechanical linkages and gearing arrangements to provide the desired result. However, the system illustrated is relatively complicated in that it comprises a significant number of interrelated moving mechanical parts, compromising its cost, utility and precision, and accordingly, its public acceptance.

It therefore remains desirable to develop a lighting system which is capable of directing a beam of light both horizontally and vertically, in accordance an operator's needs, and which is flexible in operation and simple in construction.

SUMMARY OF THE INVENTION

It is therefore a primary object of the present invention to develop a lighting system which is capable of directional movement, both horizontally and vertically, in accordance with a user's needs.

It is also an object of the present invention to develop a directionally variable lighting system which can be directed from the interior of a vehicle with which the lighting system is associated.

It is also an object of the present invention to develop a directionally variable lighting system which is flexible in operation, enabling the user to achieve a broad spectrum of lighting effects in a straightforward manner.

It is also an object of the present invention to develop a directionally variable lighting system which is simple in construction and inexpensive in cost.

These and other objects are achieved in accordance with the present invention by providing a head lamp assembly which is capable of attachment to various portions of an associated vehicle, and which contains a headlight which is gimballed for rotation, both horizontally and vertically, in accordance with electrical signals produced from a control unit located within interior portions of the vehicle.

Horizontal and vertical movement of the gimballed headlight is achieved by a pair of electric motors which are operationally linked with a gimballed frame housing the headlight so that appropriate electrical signals produced at the control unit in turn operate the motors and rotate the assembly accordingly. Further flexibility is achieved in accordance with the present invention by providing a pair of such head lamp assemblies, which are either capable of separate directional variation, or directional variation in tandem, in accordance with the needs of the vehicle's operator.

As a further improvement, the head lamp assembly is preferably provided with a cover or door which is capable of selective movement between a close position which covers the headlight contained by the head lamp assembly, and an open position which exposes the headlight when its uses is desired. Again, operation of this cover is capable of control from within interior portions of the vehicle, preferably by a switch associated with the directional controls previously described.

The foregoing head lamp assembly is provided with means for conveniently mounting the assembly to various portions of a vehicle, including attachment to the vehicle's bumper or fender, or to a roll-bar associated with the vehicle, as desired. For further detail regarding one preferred embodiment of the present invention, reference is made to the following detailed description, taken in conjunction with the following illustrations.

BRIEF DESCRIPTION OF THE DRAWINGS

FIG. 1 is a partial, perspective view of a head lamp assembly produced in accordance with the present invention, also showing a preferred embodiment control unit for use in connection therewith.

FIG. 2 is a side elevational view of the head lamp assembly of FIG. 1 with the cover in the closed position, and with the side removed to show internal construction detail.

FIGS. 5 and 6 are side elevational views of the head lamp assembly, with the side removed to again show internal construction detail, and showing rotation of the associated headlight about a horizontal axis.

In the several views provided, like reference numerals denote similar structure.

DETAILED DESCRIPTION OF THE PREFERRED EMBODIMENT

Figure 3:
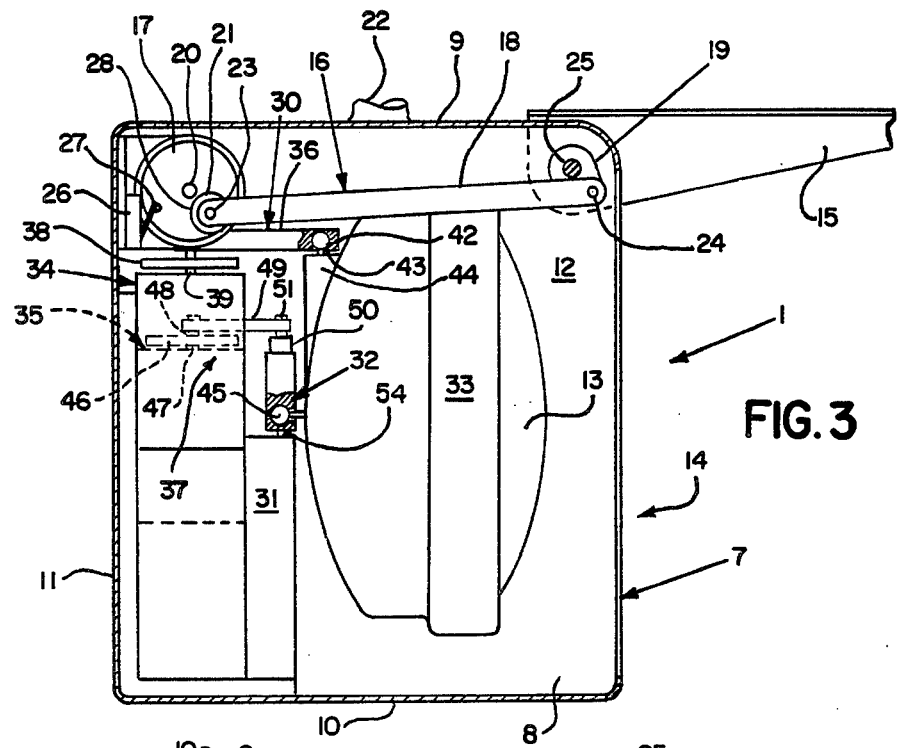
FIG. 3 is a side elevational view similar to that of FIG. 2, showing the cover in the open position.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates a preferred embodiment directionally variable head lamp assembly 1 in operational association with a vehicle 2. In the illustrative example provided, it will be noted that the head lamp assembly 1 has been attached beneath the bumper 3 of the vehicle 2, generally beneath the conventional headlight 4 which is traditionally associated with the grill 5 of the vehicle 2. Although not specifically illustrated, it is to be understood that the vehicle 2 of the type illustrated will generally incorporate a second conventional headlight (not shown) at the opposite end of the grill 5. Preferably, a second head lamp assembly (not shown) essentially similar to the head lamp assembly 1 illustrated would be similarly associated with the opposite side of the vehicle 2, providing a symmetrical installation. Also illustrated in FIG. 1 is a control panel 6 for operating the head light assembly 1, as will be more fully described below.

The head lamp assembly 1 generally comprises an enclosure 7 comprised of sides 8, a top 9, a bottom 10, and a back 11, to define a cavity 12 for housing a headlight 13 as illustrated. Appropriate means, such as the pylon 22, are provided to mount the enclosure 7 to various portions of the vehicle 2, as desired, it being understood that the installation shown in the drawings is merely provided for illustrative purposes.

The headlight 13 is capable of being selectively exposed to the exterior through an open end 14 of the enclosure 7 by means of a cover 15 which is pivotally associated with the open end 14 of the enclosure 7, and which is preferably dimensioned to substantially enclose the open end 14 of the enclosure 7 when in a closed position, as is best illustrated in FIG. 2.

FIG. 2 further illustrates an operator 16 for moving the cover 15 between a closed and an opened position, as follows. The operator 16 generally comprises a motor 17, a connecting rod 18 and a cam 19. The shaft 20 of the motor 17 is provided with a cam 21 which is pivotally associated with one end of the connecting rod 18, at the pivot 23. The remaining end of the connecting rod 18 is pivotally associated with the cam 19, at the pivot 24. The cam 19 is fixedly associated with one of the hinges 25 which pivotally connect the cover 15 to the sides 8 of the enclosure 7. Accordingly, rotation of the cam 21 by the motor 17 will cause rotation of the cam 19 through the connecting rod 18, in turn causing movement of the cover 15 from the position illustrated in FIG. 2 to the position illustrated in FIG. 3. With reference to these figures, it will be noted that the cams 19, 21 and the connecting rod 18 have also changed position accordingly. This movement causes exposure of the headlight 13 to the exterior of the enclosure 7, and is also used to activate the headlight 13 as follows.

With reference to FIGS. 2 and 3, a switch 26 is operatively associated with the cam 21 so that the follower 27 of the switch 26 engages the periphery 28 of the cam 21. As a result, when the cover 15 assumes the closed position, as illustrated in FIG. 2, the follower 27 of the switch 26 is compressed by the cam 21. When the cover 15 assumes the open position, as illustrated in FIG. 3, the cam 21 will release the follower 27. By providing a switch 26 which normally assumes a closed position, this change in state will cause the headlight 13 to be deactivated when the cover 15 is closed, by preventing current from being delivered to the headlight 13, and to be activated when the cover 15 is opened, by permitting current to be delivered to the headlight 13. In this manner, operation of the headlight 13 is only permitted when the cover 15 is opened. The manner in which this function is controlled will be described in further detail below.

Similarly, the switch 26 also preferably serves as a means for enabling rotation of the headlight 13 within the enclosure 7 in accordance with the present invention. To permit such rotation, the head lamp assembly 1 is provided with a rotation assembly 30 which generally comprises a mount 31 associated with the enclosure 7; a gimbal means 32 pivotally associated with the mount 31; a frame 33 attached to the gimbal means 32, and capable of containing the headlight 13; a pair of motors 34, 35 attached to the mount 31; and a pair of linkages 36, 37 operatively associated with the motors 34, 35 as follows.

Figure 4:
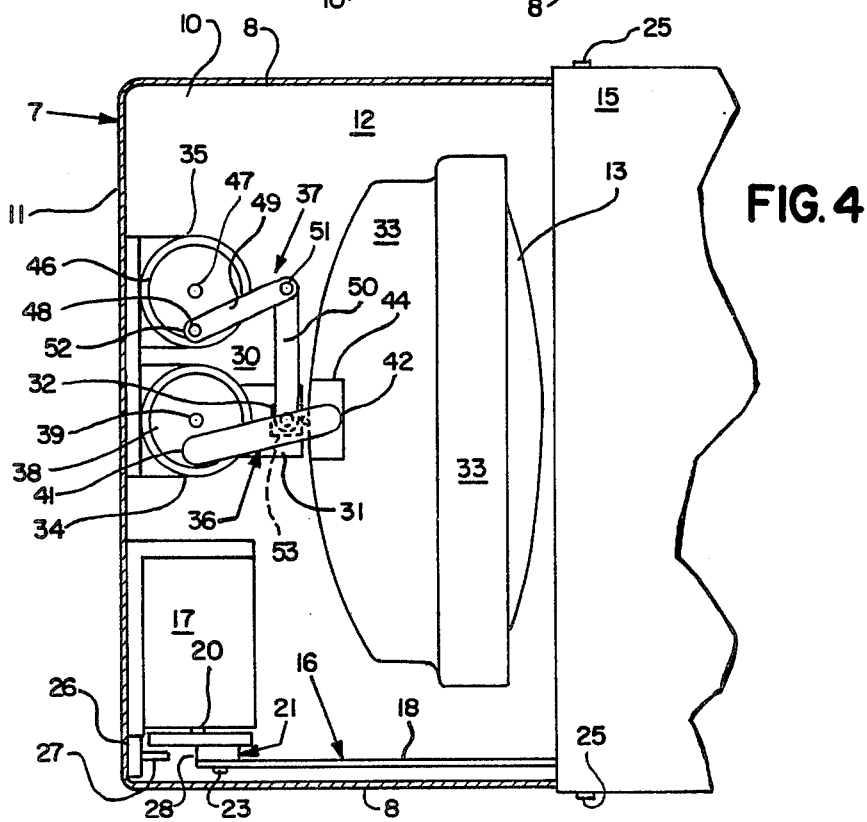
FIG. 4 is a top plan view of the head lamp assembly illustrated in FIG. 3, with the top removed to show internal construction detail.

The motor 34 and the linkage 36 are used to cause rotation of the frame 33 about a horizontal axis, providing means for adjusting the angle of elevation of the headlight 13. With reference to FIGS. 3 and 4, such movement is accomplished by providing the motor 34 with a table 38, the center of which engages the output shaft 39 of the motor 34, and the face of which is provided with a ball joint 40 for engaging one end 41 of the linkage 36. The remaining end 42 of the linkage 36 engages a second ball joint 43 which forms part of a bracket 44 attached to the frame 33 as shown. Rotation of the table 38 by the motor 34 will cause corresponding movement of the ball joint 40 associated with the table 38, in turn reciprocating the linkage 36. Since the frame 33 is pivotally attached at the gimbal means 32 by the ball joint 45 shown, this will in turn cause pivotal displacement of the frame 33 about a horizontal axis in accordance with operation of the motor 34.

The motor 35 and the linkage 37 are used to cause rotation of the frame 33 about a vertical axis, providing means for adjusting lateral movement of the headlight 13. Again referring to FIGS. 3 and 4, such movement is accomplished by providing the motor 35 with a table 46, the center of which engages the output shaft 47 of the motor 35, and the face of which is provided with a pivot 48 which is capable of engaging the linkage 37. The linkage 37 comprises two interconnected members 49, 50 joined at a pivot 51 as shown. The free end 52 of the member 49 engages the pivot 48 while the free end 53 of the member 50 engages the gimbal means 32. The free end 53 of the linkage 37 is fixedly attached to the gimbal means 32 so that rotation of the member 50 will cause corresponding rotation of the gimbal means 32 with respect to the mount 31, at the pivot 54. Rotation of the motor 35 will cause rotation of the table 46, in turn reciprocating the first member 49 of the linkage 37. Since the first member 49 is pivotally connected to the second member 50, at the pivot 51, this movement will in turn cause rotation of the member 50 and the associated gimbal means 32 about a vertical axis in accordance with operation of the motor 35.

It is to be noted that the operation of each segment of the above described rotation assembly 30 will proceed independently of the other since the frame 33 which houses the headlight 13 is pivotally associated with each of the linkages 36, 37, as well as the gimbal means 32. Operation of the foregoing structure will proceed as follows.

Referring again to FIG. 1, a control panel 55 is illustrated which incorporates switches 56, 57 and a joy-stick means 58. A first switch 56 activates the assembly 1 by delivering current in a first direction to the motor 17 which operates the cover 15. In the embodiment illustrated, the switch 56 is a conventional toggle switch connected to the electrical system of the vehicle 2 in known manner. Activation of the motor 17 by the switch 56 will cause rotation of the motor 17, moving the cover 15 from the closed position illustrated in FIG. 2 to the open position illustrated in FIG. 3. As previously described, this will also release the follower 27 of the switch 26, in turn activating the headlight 13 and the rotation assembly 30.

Operation of the rotation assembly 30 is performed using the joy-stick means 58, preferably in conjunction with the switch 57 as follows. The switch 57 incorporates three positions, which positions are selectable by a knob 59 associated with switch 57. As an example, a left-most position 60 of the knob 59 could be used to cause adjustment of a head lamp assembly 1 associated with the left side of the vehicle 2, while a right-most position 61 could be used to cause adjustment of a headlight assembly 1 associated with the right side of the vehicle 2. The center position 62 could be used to cause simultaneous adjustment of head lamp assemblies 1 associated with both the left and right side of the vehicle 2. In either event, after selecting an adjustment mode, rotation of the selected head lamp assembly or assemblies would be performed by movement of the joy-stick means 58 to the left or right, or up and down, as desired.

For example, upward movement of the joy-stick means 58 will cause rotation of the motor 34, in turn causing movement of the linkage 36 from the nominal position illustrated in FIG. 3 to the position illustrated in FIG. 5. This will, in turn, draw back on the ball joint 43 associated with the frame 33 which houses the headlight 13, resulting in elevation of the headlight 13 in accordance with operation of the joy-stick means 58. Downward movement of the joy-stick means 58 will similarly cause movement of the frame 33 and headlight 13 from the nominal position illustrated in FIG. 3 to the position illustrated in FIG. 6. Of course, it will be understood that the frame 33 and headlight 13 could be adjusted to positions intermediate those illustrated in FIGS. 5 and 6 by appropriately moving the joy-stick means 58.

Figure 7:
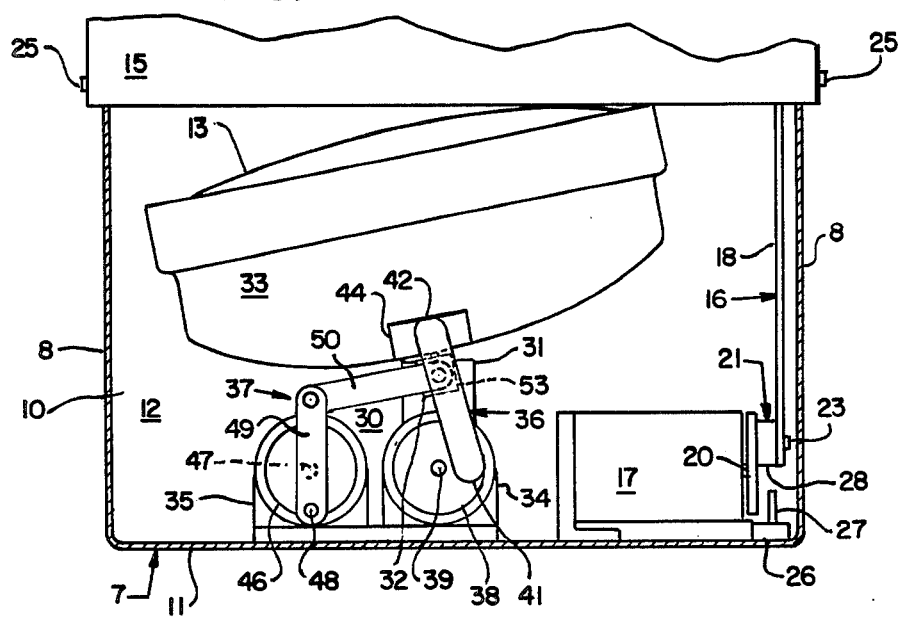
FIGS. 7 and 8 are top plan views of the head lamp assembly, with the top removed to again show internal construction detail, and showing rotation of the associated headlight about a vertical axis.
Figure 8:
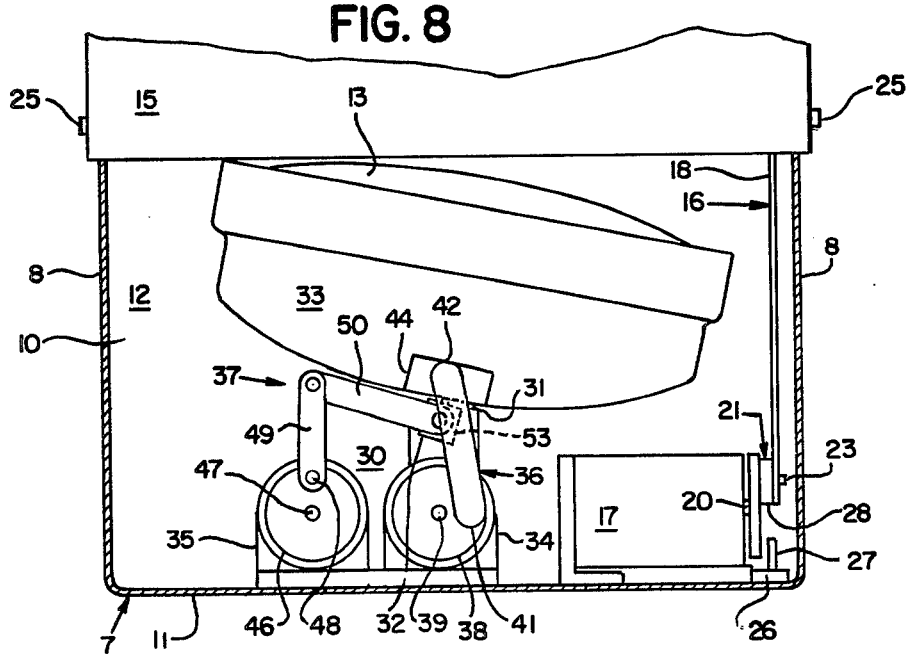

Movement of the joy-stick means 58 toward the left will cause rotation of the motor 35, in turn causing reciprocal movement of the first member 49 forming the linkage 37 from the nominal position illustrated in FIG. 4 to the position illustrated in FIG. 7. Reciprocal movement of the first member 49 will draw back on the second member 50 of the linkage 37, causing counterclockwise rotation of the member 50 and the gimbal means 32, in turn rotating the frame 33 and the headlight 13 to the left in accordance with operation of the joy-stick means 58. Movement of the joy-stick means 58 toward the right will similarly cause movement of the frame 33 and headlight 13 from the nominal position illustrated in FIG. 4 to the position illustrated in FIG. 8. Again, the frame 33 and headlight 13 could be adjusted to positions intermediate those illustrated in FIGS. 7 and 8 by appropriately moving the joy-stick means 58.

As a result, orientation of the frame 33 and headlight 13 will be freely adjustable (both horizontally and vertically) according to user need, and may be freely varied from one position to another as needed. As previously mentioned, in the event that two head lamp assemblies 1 are being used, adjustment may proceed either concurrently or separately, in accordance with the mode selected using the switch 57.

When operation of the head lamp assembly 1 is to be discontinued, the switch 56 is used to deactivate the system. To do so, the switch 56 is used to reverse the direction in which current is delivered to the motor 17, causing reversal of the motor 17 and returning the cover 15 and operator 16 to the positions illustrated in FIG. 2. As this process is completed, the cam 21 will contact the follower 27 of the switch 26, deactivating the headlight 13 and disabling the rotation assembly 30. Operation of the head lamp assembly 1 may therefore be initiated and discontinued as desired, from within the interior of the vehicle 2.

It will therefore be seen that the head lamp assembly 1 and control panel 55 illustrated serve well to achieve each of the objectives previously set forth. It will also be understood that the various components previously described may be varied without departing from the spirit and scope of the present invention.

For example, the configuration of the enclosure 7 and the cover 15 may be varied, depending on space or styling requirements, or other needs. In some applications, it would be possible to eliminate use of the cover 15 to provide a less expensive unit. However, this is less desirable since the headlight 13 would then remain exposed at all times, accordingly exposing the headlight 13 to a greater potential for damage.

As previously mentioned, the enclosure 7 may be attached to the vehicle 2 in a variety of different ways and at a variety of different locations. As a further advantage, it would even be possible to replace the vehicle's conventional headlight 4 with a head lamp assembly 1 produced in accordance with the present invention, providing the vehicle with a fully adjustable headlight system. Of course, the use of this feature may be limited by some state inspection laws.

Lastly, it is possible to vary the configuration of the control panel 55, either by varying the location of the components which it incorporates, or by modifying the functions of these components. For example, the function of the activation switch 56 could be incorporated into the switch 57 by providing a fourth position which would cause deactivation of the system. Although generally less desirable, it would also be possible to replace the joy-stick means 58 with other types of components which would perform a similar function (rotary potentiometers, sliding potentiometers, etc.). Other variations are also possible.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for containing a headlight, comprising:
   (a) an enclosure having at least one opening therein;
   (b) frame means for containing the headlight so that the headlight faces the opening;
   (c) gimbal means attached to the frame means and pivotally engaging mount means associated with the enclosure;
   (d) first operator means pivotally connected between first drive means associated with the enclosure and the operative combination comprising the frame means and the gimbal means; and
   (e) second operator means pivotally connected between second drive means associated with the enclosure and the operative combination comprising the frame means and the gimbal means.

2. The apparatus of claim 1 wherein the first operator means and the second operator means are independently operable.

3. The apparatus of claim 1 wherein the first drive means and the second drive means are electric motors.

4. The apparatus of claim 1 wherein the gimbal means is a ball joint attached to the frame means and pivotally engaging the mount means at a single location.

5. The apparatus of claim 1 wherein the first operator means comprises:
   (a) camming means engaging the first drive means and including first ball joint means associated therewith;
   (b) second ball joint means attached to the frame means; and
   (c) rod means pivotally connected between the first ball joint means and the second ball joint means;
so that rotation of the first drive means causes reciprocation of the rod means and rotation of the frame means about the gimbal means.

6. The apparatus of claim 5 wherein the degree of rotation of the frame means is regulated by the degree of rotation of the first drive means.

7. The apparatus of claim 6 wherein the first drive means is electrically actuated.

8. The apparatus of claim 1 wherein the second operator means comprises:
   (a) camming means engaging the second drive means and including pivot means associated therewith;
   (b) lever means, one end of which is attached to the gimbal means; and
   (c) rod means pivotally connected between the pivot means and the other end of the lever means;
so that rotation of the second drive means causes reciprocation of the rod means and rotation of the gimbal means and the associated frame means.

9. The apparatus of claim 8 wherein the degree of rotation of the frame means is regulated by the degree of rotation of the second drive means.

10. The apparatus of claim 9 wherein the second drive means is electrically actuated.

11. The apparatus of claim 1 further comprising:
    (a) cover means pivotally engaging the enclosure and capable of selectively covering the opening;
    (b) third operator means pivotally connected between third drive means associated with the enclosure and the cover means.

12. The apparatus of claim 11 wherein the third drive means is an electric motor.

13. The apparatus of claim 11 wherein the third operator means comprises:
    a camming means engaging the third drive means and including pivot means associated therewith;
    (b) lever means, one end of which is attached to the cover means; and
    (c) rod means pivotally connected between the pivot means and the other end of the lever means;
so that rotation of the third drive means causes reciprocation of the rod means and rotation of the lever means, rotating the cover between a closed position which encloses the opening and an open position which exposes the opening.

14. The apparatus of claim 13 further comprising switch means operatively associated with the camming means.

15. The apparatus of claim 14 wherein the switch means deactivates the headlight when the cover means encloses the opening, and actuates the headlight when the cover means does not enclose the opening.

16. The apparatus of claim 15 wherein the switch means deactivates the first drive means and the second drive means when the cover means encloses the opening, and enables activation of the first drive means and the second drive means when the cover means does not enclose the opening.

17. The apparatus of claim 16 further comprising control means for selectively rotating the third drive means to selectively rotate the cover means between the open and closed position.

18. The apparatus of claim 1 further comprising control means for selectively rotating the first drive means and the second drive means.

19. The apparatus of claim 18 wherein the first drive means and the second drive means are capable of separate or simultaneous operation by the control means.

20. The apparatus of claim 19 wherein the control means is a joy-stick means.

21. The apparatus of claim 18 wherein a plurality of headlight containing apparatuses are associated with a single control means and wherein the single control means is capable of separately or simultaneously adjusting the plurality of associated headlight containing apparatuses.

22. A directionally variable driving light assembly comprising:
    (a) an enclosure having an open end;
    (b) frame means for containing a headlight;
    (c) gimbal means for mounting said frame means within said enclosure facing said open end;
    (d) said gimbal means mounting said frame means for pivotal displacement about a first axis and a second axis with respect to said enclosure;
    (e) first means for selectively positioning said frame means with respect to said first axis including:
       (i) first operator means mounted to said enclosure;
       (ii) first linkage means coupling said first operator means to said frame means such that operation of said first operator means pivots said frame means about said first axis; and
       (iii) said first linkage means permitting said frame means to pivot about said second axis; and (f) second means for selectively positioning said frame means with respect to said second axis including:
  (i) second operator means mounted to said enclosure;
  (ii) second linkage means coupling said second operator means to said gimbal means such that operation of said second operator means pivots said frame means about said second axis; and
  (iii) said second linkage means permitting said frame means to pivot about said first axis.

23. A directionally variable driving light assembly according to claim 22 wherein:
said first axis and said second axis of pivotal displacement of said frame means are substantially orthogonal.

24. A directionally variable driving light assembly according to claim 23 further comprising:
  (a) cover means displaceably mounted to said enclosure for displacement between a first position covering said open end and a second position uncovering said open end of said enclosure; and
  (b) means for displacing said cover means between said first and second positions.

25. A directionally variable driving light assembly according to claim 24 further comprising:
  (a) switch means operatively associated with said cover means for controlling power supplied to the headlight;
  (b) said switch means prohibiting power to be supplied to the headlight when said cover means is in said first covering position; and
  (c) said switch means permitting power to be supplied to the headlight when said cover means is in said second uncovering position.

26. A directionally variable driving light assembly according to claim 23 further comprising: means for selectively controlling said first operator means and said second operator means independently and jointly.

27. A directionally variable driving light assembly according to claim 22 further comprising:
a headlight contained within said frame means.

28. A plurality of driving light assemblies according to claim 23 further comprising:
  (a) a control means for operating said first and second operators of said driving light assemblies;
  (b) means for selectively associating said driving light assemblies with said control means such that said control means simultaneously controls one or more selected ones of said plurality of assemblies.

29. A plurality of directionally variable driving light assemblies according to claim 28 further comprising:
  (a) cover means displaceably mounted to each said enclosure of said plurality of assemblies for displacement between a first position covering said open end and a second position uncovering said open end of said respective enclosure; and
  (b) means for displacing each said cover means between said first and second positions.

30. A plurality of directionally variable driving light assemblies according to claim 29 further comprising:
  (a) switch means operatively associated with each said cover means for controlling power supplied to the respective headlight;
  (b) each said switch means prohibiting power to be supplied to the respective headlight when said respective cover means is in said first covering position; and
  (c) each said switch means permitting power to be supplied to the respective headlight when said respective cover means is in said second uncovering position.

* * * * *